Oct. 22, 1935.  S. JOHNSON, JR  2,018,212
BRAKE MECHANISM
Filed Aug. 23, 1932  2 Sheets-Sheet 2
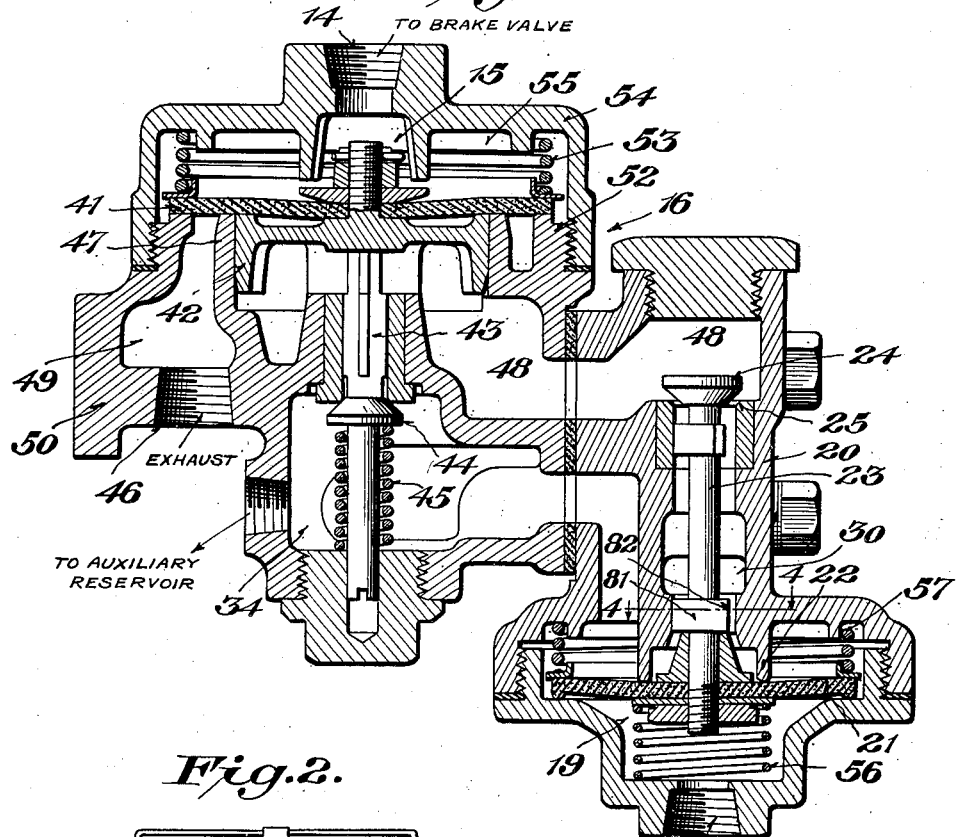
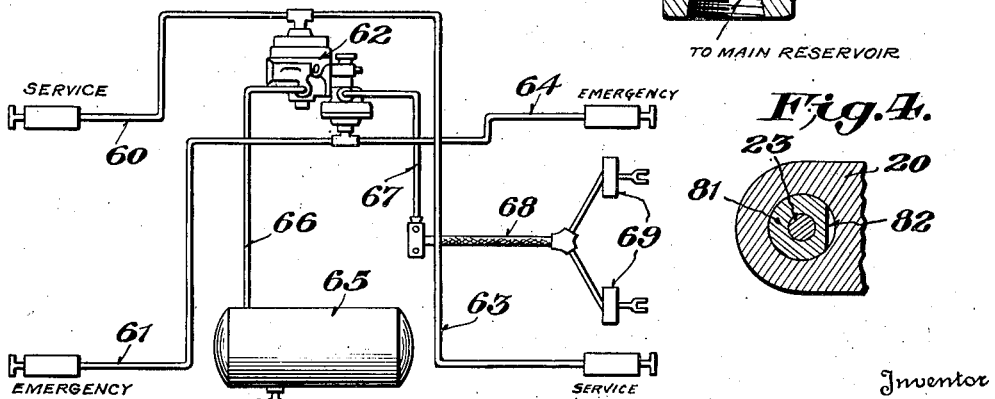

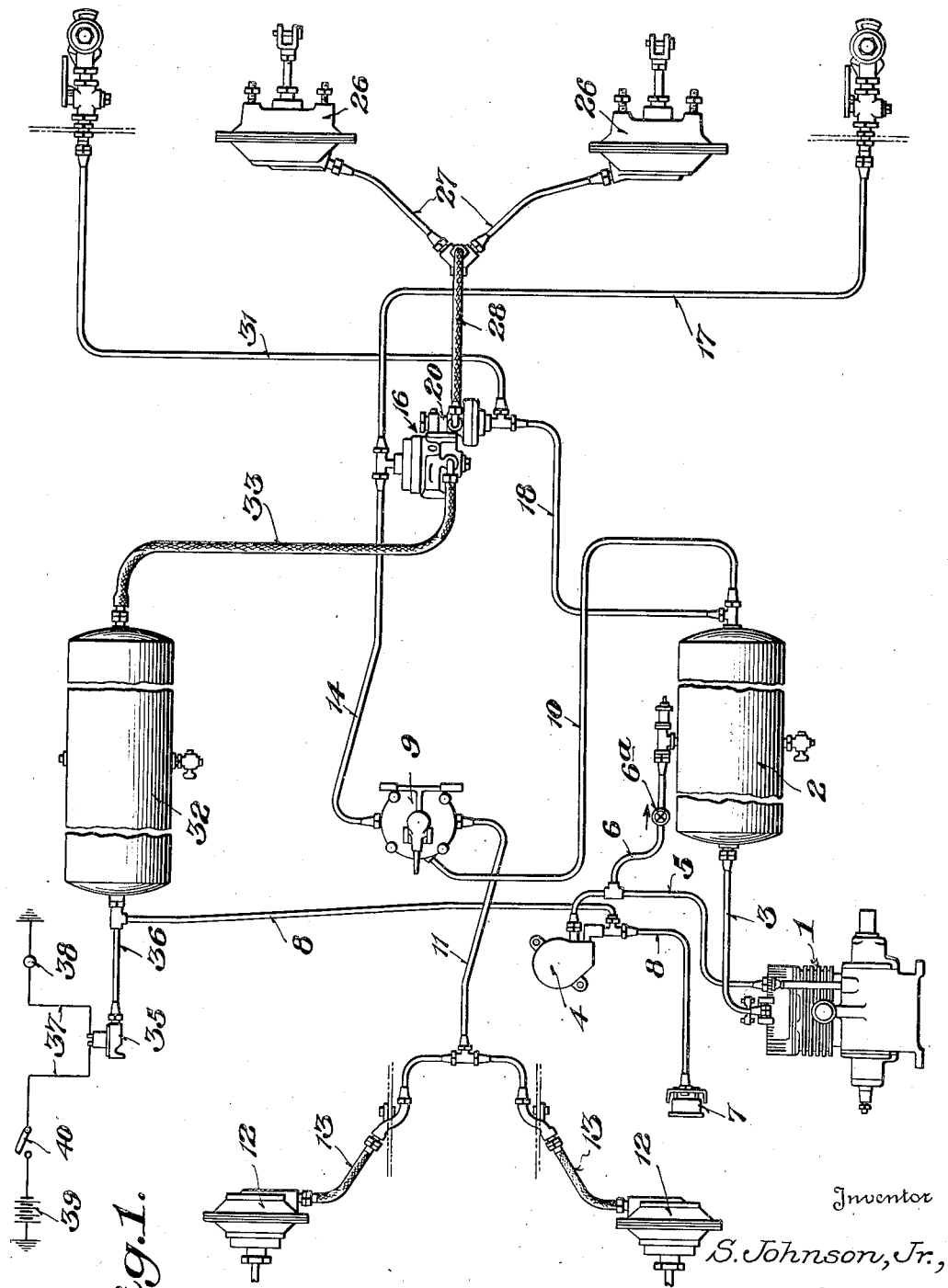

Patented Oct. 22, 1935

2,018,212

UNITED STATES PATENT OFFICE 2,018,212

BRAKE MECHANISM

Stephen Johnson, Jr., Pittsburgh, Pa., assignor to Bendix Westinghouse Automotive Air Brake Company, Pittsburgh, Pa., a corporation of Delaware Application August 23, 1932, Serial No. 630,123

6 Claims. (Cl. 303—26)

This invention relates to brakes and, more particularly to fluid pressure braking systems for automotive vehicles.

The principal object of the present invention is to provide for operation of certain of the brakes on a vehicle in the event of failure of other brakes thereon.

More specifically, an object of the invention is to provide for automatic operation of the brakes on the rear wheels of the truck and on the trailer in the event of failure of the lines leading to the front wheel brakes.

A further object of the invention is to provide for application of the tractor rear wheel brakes and the trailer brakes in the event of failure of the tractor front wheel brake lines, such application taking place on operation of the brake valve to make a normal brake application.

A further object is to provide for automatic operation of certain of the truck brakes and all of the trailer brakes in the event of failure of the main reservoir system on the truck.

A further object is to provide for automatic operation of the rear wheel truck brakes and all of the trailer brakes in the event of failure of the main reservoir system on the truck, causing the main truck reservoir to drain, such application to be immediately effected regardless of whether the brake valve is operated or not.

A further object is to provide for operation of the rear wheel truck brakes and all trailer brakes in the event of rupture or other failure of the service line connecting the tractor and trailer, such operation to be had only when the brake valve is operated.

A still further object is to provide for immediate and automatic emergency application of the rear wheel tractor brakes and all trailer brakes in the event of failure of the charging line leading to the trailer.

A still further object is to provide a fluid pressure braking system which will be so designed as to give maximum security at all times regardless of the failure of parts of the system, but which will, at the same time, include a minimum number of parts and a minimum length of piping.

The above and other objects will appear more fully hereinafter from the following detailed description when taken in connection with the accompanying drawings wherein one form of the present invention is illustrated. It is to be expressly understood, however, that the drawings are for purposes of illustration only and are not designed as a definition of the limits of the invention, reference being had for this purpose to the appended claims.

Referring to the drawings, in which similar reference numerals refer to similar parts.

Fig. 1 is a view of the tractor system, showing the parts thereof in operative relation to each other, Fig. 2 is a view of the trailer system, showing the parts thereof in operative relation to each other, Fig. 3 is a sectional view showing the relay-emergency valve illustrated more generally in Figs. 1 and 2, and Fig. 4 is a view taken on the line 4—4 of Fig. 3.

The fluid pressure braking system as disclosed in Fig. 1 comprises a compressor 1 which supplies fluid under pressure, such as compressed air, to a reservoir 2 through piping 3. A governor unit 4 which may be constructed as shown in Aikman Patent No. 1,754,218, issued April 15, 1930, is provided and is connected to the compressor unloading unit through piping 5, such piping 5 constituting an unloading line and being connected by piping 6 to reservoir 2. A check valve 6a is provided in pipe 6 and allows fluid under pressure to flow to reservoir 2 but prevents any flow from said reservoir in the reverse direction. A reservoir 32, to be referred to more in detail hereinafter, is provided, and is connected to the governor unit 4 through piping 8, such piping 8 being connected by pipe 8a to a pressure gauge 7. The foregoing describes a novel means of connecting the compressor, reservoirs and controlling and unloading mechanism, the operation of which will be described hereinafter.

A brake valve 9 is provided, the construction thereof forming no part of the present invention, and such brake valve is constantly supplied with fluid under pressure from reservoir 2 through piping 10. Brake valve 9 is adapted to be manually operated to connect piping 10 to pipe 11 leading to the front brake chambers 12 through flexible piping 13, and to pipe 14, leading to the chamber 15 of relay-emergency valve 16, as will be more fully described hereinafter. Fluid pressure in pipe 14 is also transmitted through pipe 17 to the trailer relay valve, the tractor and trailer relay valves thereby being simultaneously operated on actuation of the brake valve 9.

Referring particularly to Fig. 3 of the drawings it will be seen that the relay-emergency valve illustrated therein comprises a relay valve casing 50 and an emergency valve casing 20. Relay valve casing 50 is formed with upwardly-extending concentric annular seats or ridges 47 and 52, a space 49 being defined therebetween which is constantly open to the atmosphere through exhaust port 46, and which is normally in communication with a second space or cavity 48 which is included in both the relay and emergency valve casings. A diaphragm 41 seats, at its periphery, on annular flange 52 and is held thereon by a spring 53. A cover 54 is screwed onto casing 50 and defines an internal space 55 into which the pipe 14 leading from the brake valve 9 is adapted to be secured. Diaphragm 41 is disposed in space 55 and is normally held by its own resilience against the annular member 47. The central part of the diaphragm may be forced downwardly by fluid under pressure from brake valve 9 on operation thereof, carrying with it attached spider or guiding member 42, valve rod 43 and valve 44, thereby sealing off communication between chamber 48 and chamber 49 due to the diaphragm 41 being forced against the inner annular seat 47, and opening communication between chamber 48 and a lower chamber 34 which is in constant communication with the auxiliary reservoir 32 through pipe 33. Auxiliary reservoir pressure in chamber 34 constantly acts on the upper side of emergency valve diaphragm 21, urging the same against its peripheral seat, but away from a concentric inner seating ridge 22. Such pressure on diaphragm 21 is resisted by main reservoir pressure acting on the lower side thereof, the diaphragm therefore being normally held seated on seat 22 by main reservoir pressure aided by spring 56 and seated on its peripheral seat by auxiliary reservoir pressure aided by spring 57. The diaphragm in this position maintains attached valve rod 23 and valve 24 in raised position thereby allowing open communication between chamber 48 and a chamber 30 which is connected at all times to rear brake chambers 26. Normally therefore, rear brake chambers 26 are connected to chamber 48 through piping 27 and 28, chamber 30, and past normally open valve 24. When the rear brakes are released after an application thereof, chamber 55 will be vented to atmosphere through brake valve 9 and therefore pressure in the rear brake chambers and chamber 30 of the relay emergency valve will force guide member 42 and diaphragm 41 upwardly, thereby connecting the rear brake chambers to atmosphere through chamber 49, which contains exhaust port 46. Valve rod 23 is provided with attached guides 80 and 81, the same co-operating with the casing 20 to insure proper alignment of valve 24. Guide 81, which is shown more clearly in Fig. 4, comprises a disk having a portion cut away at 82 to provide a restricted communication between chamber 30 and chamber 34 when diaphragm 21 is unseated from seat 22.

Referring again particularly to Fig. 1 of the drawings, pressure from reservoir 2 is transmitted through piping 18 to chamber 19 in the emergency valve portion 20 of the relay-emergency valve. Such fluid pressure constantly acts on diaphragm 21 maintaining the same on its annular seat 22 and raising the stem 23 to thereby hold valve 24 away from its seat 25 and in open position. Rear brake cylinders 26 are connected by flexible piping 27 and tubing 28 to chamber 30 in the emergency valve portion 20 of the relay-emergency valve. Reservoir 2 is connected to the trailer emergency valve by means of pipe 31, the same being connected by means of a suitable joint to pipe 18.

An auxiliary reservoir 32 is provided, the same being connected by piping 33 to chamber 34 of the relay-emergency valve 16. Reservoir 32 is charged with fluid under pressure from compressor 1 through piping 3, reservoir 2, piping 18, chamber 19 of the relay-emergency valve, past the edge of diaphragm 21, chamber 34 and piping 33. A pressure responsive means 35 is connected to reservoir 32 by piping 36 and is adapted, when the pressure in reservoir 32 drops to a predetermined pressure, to close a circuit 37 whereby a lamp, or other signal means 38, will be energized by a battery 39, whereby the operator of the vehicle will be warned of depletion of the pressure in reservoir 32. A manually-operable switch 40 may be provided in the circuit for controlling the same.

In the operation of the above-described system, fluid under pressure such as compressed air is supplied by compressor 1 to reservoir 2 through piping 3 and to reservoir 32 in the manner described above. Governor unit 4 controls the operation of the compressor and regulates the pressure developed in an improved manner due to the present novel arrangement. It will be apparent that when the compressor 1 is unloaded, i. e. is delivering to atmosphere, reservoir 32 is connected to reservoir 2 through pipe 8, governor mechanism 4, and pipes 5 and 6, the check valve 6a permitting flow from reservoir 32 to reservoir 2 but not in the opposite direction. When the compressor starts to deliver fluid under pressure to reservoir 2, the unloader line 5 exhausts to atmosphere through the governor unit, the check valve 6a preventing similar exhausting of the reservoir 2. Thus when the compressor is loaded, reservoirs 2 and 32 are equalized through the emergency valve 20 which allows fluid under pressure to pass only from reservoir 2 to reservoir 32 and when the compressor is unloaded the reservoirs are equalized through the governor unit. As the brake valves are normally set for a pressure lower than the pressure for which the governor is set, failure of a service line will not endanger the operation of the brakes over the range for which the governor is set. Below such range the connection through the governor is cut off and application of the brake valve after failure of a service line will cause an emergency application. Fluid pressure is constantly supplied from reservoir 2 to brake valve 9 through piping 10 and, on operation of such brake valve, fluid under pressure will flow to front brake chambers 12, thereby operating the front wheel brakes, and to chamber 15 of relay-emergency valve 16 through piping 14, thereby depressing the central portion of diaphragm 41 and forcing guide member 42 and valve rod 43 downwardly, thereby opening valve 44 against the force of spring 45. Chamber 30, which is connected to rear brake chambers 26, is now cut off from exhaust port 46 due to the fact that diaphragm 41 is held tightly against annular seat 47, and is connected to the auxiliary reservoir 32 through piping 33, chamber 34, past the opened valve 44, chamber 48, past valve 24 which is held open by pressure from reservoir 2 acting on diaphragm 21, thereby causing actuation of the rear-wheel brakes. The above describes in detail the normal service operation of the braking system.

An emergency operation of the system proceeds as follows: If it be assumed that pipes 3, 10, 18, 31 or 6 break or otherwise fail, then reservoir 2 will drain to the atmosphere and pressure on the lower side of the diaphragm 21 of the relay-emergency valve 16 will be relieved. Fluid under pressure from auxiliary reservoir 32 which constantly acts on the upper side of diaphragm 21 will now force that diaphragm downwardly, thereby forcing valve member 24 onto its seat 25 and closing the connection between chamber 30, the connected rear brake chambers and the exhaust port 46. When diaphragm 21 is forced downwardly, as described, it is unseated from the annular ridge 22 and fluid under pressure from the auxiliary reservoir 32 will flow to rear brake chambers 26 through piping 33, chamber 34, past the annular ridge 22, through the restricted opening 82, chamber 30 and piping 28 and 27. The same action takes places in the trailer system due to the relief of pressure in emergency pipe 31 and all trailer brakes and the rear tractor brakes will therefore be applied. It is to be noted that such application is entirely automatic on the failure of any of the pipes noted above and is not dependent on the operation of the brake valve by the operator. After an emergency application, such as described, the brakes cannot be released until the broken line has been repaired and pressure in reservoir 2 built up to that of reservoir 32 and to that of the trailer reservoir. It will also be noted that due to the provision of the restriction 82 in the passage between chamber 34 and chamber 30, a drop in pressure in chamber 19 will positively cause an emergency valve operation, no matter what the rate of pressure drop may be. This is due to the fact that if the rate of pressure drop is slow, pressure from chamber 34 will build up between the diaphragm and the guide member 81, the passage through restricted opening 82 being very slow, and will aid the pressure in chamber 34 in causing an emergency operation. If the restriction were not provided, and the pressure drop in chamber 19 were slow, pressure from chamber 34 escaping by seat 22 would escape to atmosphere past valve 24, thus reducing the pressure in the auxiliary reservoir without causing an emergency operation.

If it now be assumed that any of pipes 11, 13, 14 or 17 should break or otherwise fail, it will be seen that reservoir 2 will drain to the atmosphere only when brake valve 9 is operated to give a normal service operation. On draining of reservoir 2, pressure in pipe 18 and chamber 19 of the relay-emergency valve will be reduced to atmospheric and fluid under pressure in chamber 34, from the auxiliary reservoir 32 will force diaphragm 21 downwardly, closing valve 24 and admitting auxiliary reservoir pressure to the rear brake cylinders 26 through pipe 33, chambers 34, past diaphragm 21 and annular ridge 22, through the restricted opening 82, chamber 30, and pipes 28 and 27. The same action will take place on the trailer due to failure of pressure in emergency pipe 31, thereby giving an emergency application of the rear tractor brakes and all trailer brakes on failure of any of the pipes listed above, it being remembered that such application takes place only on operation of the brake valve to effect a normal brake application.

In the event of breakage of pipe 33, reservoir 32 will drain directly to the atmosphere, thereby reducing the pressure on the upper side of diaphragm 21 to atmospheric and allowing reservoir 2 to drain to atmosphere through pipe 18, chamber 19, past the edge of diaphragm 21, chamber 34 and to the broken line 33. This will result in a pressure reduction in line 31 sufficient to operate the trailer emergency valve and apply the trailer brakes.

In the event of breaking of either of lines 27 or 28 auxiliary reservoir 32 will drain to atmosphere on operation of the brake valve 9 to give a normal service application, through pipe 33, chamber 34, past the opened valve 44, chamber 48, past opened valve 24, chamber 30 and to the broken line 27 or 28.

It is evident that leakage due to failure of unloader line 5 can only occur at pressures above the lower range of the governor, and therefore a safe braking pressure is assumed in the event that this line breaks.

Referring now particularly to Fig. 2 of the drawings it will be seen that a trailer fluid pressure braking system has been provided, the same being adapted to be operated in conjunction with the above-described tractor system, or with any suitable tractor fluid pressure braking system. In this figure reference numeral 60 designates the trailer service line, the same being adapted to be connected to the service line 17 of the tractor, and reference numeral 61 designates the trailer emergency line, the same being adapted to be connected to tractor emergency line 31. A relay-emergency valve 62 is provided on the trailer, the construction thereof being identical with the tractor relay-emergency valve 16, and the same being shown in detail in Fig. 3. Trailer service line 60 is connected to the chamber 55 of relay-emergency valve 62, the joint therewith including a T connection to one arm of which is connected the pipe 63 which may be connected to the service line of another trailer vehicle. Trailer emergency line 61 is connected to chamber 19 of the trailer relay-emergency valve 62, the connection thereto including a T connection to one arm of which a line 64 may be connected, the same being adapted to be connected to the emergency line of another trailer vehicle.

A trailer reservoir 65 is provided and is connected by pipe 66 with chamber 34 of the trailer relay-emergency valve. Chamber 30 of the relay-emergency valve is connected to trailer brake chambers 69 by piping 67 and flexible tubing 68.

In operation, trailer reservoir 65 is supplied with fluid under pressure from compressor 1 on the tractor vehicle through pipe 3, reservoir 2, pipes 18 and 31 on the tractor vehicle, chamber 19 of trailer relay-emergency valve 62, past the edge of diaphragm 21, chamber 34 of the trailer relay-emergency valve, and through pipe 66 to the trailer reservoir 65, thereby charging the same.

On a normal service application by operation of the brake valve 9 on the tractor, fluid pressure from reservoir 2 on the tractor vehicle will flow through pipe 10, brake valve 9, pipes 14 and 17, to the trailer service line 60, and chamber 55 of the trailer relay-emergency valve, thereby depressing the central part of diaphragm 41, the attached valve guide 42 and valve rod 43, and opening valve 44, thereby allowing fluid under pressure to flow from trailer reservoir 65 to the trailer brake chambers 69 through pipe 66, chamber 34 of the trailer relay-emergency valve, past opened valve 44, chamber 48, past the opened valve 24, chamber 30 and piping 67 and 68, thereby effecting a normal or service application of the trailer brakes. Such application is effected whenever the tractor brake valve is operated to give a service application.

In the event of breaking of either of pipes 60 or 63, tractor reservoir 2 will drain to atmosphere on operation of the brake valve 9 to give a service operation, and pressure acting on the lower side of diaphragm 21 of the trailer relay-emergency valve will be relieved, thereby allowing trailer reservoir pressure to force diaphragm 21 away from the annular seat 22, fluid pressure from said reservoir then flowing to trailer brake chambers 69 past such annular flange 22, through the restricted opening 82, to chamber 30 and pipes 67 and 68. It is to be noted that an emergency operation as described here will only be effected on operation of the brake valve to effect a service operation. It is also to be noted that an identical emergency application of the trailer brakes will be effected on breaking of tractor lines 11, 13, 14 or 17, as hereinbefore described.

In the event of the breaking of either of the trailer emergency lines 61 or 64, pressure in chamber 19 of the trailer relay-emergency valve will be relieved and trailer reservoir pressure in chamber 34 will force diaphragm 21 away from the annular flange 22, such pressure then flowing to trailer brake chambers past the annular flange 22, through restricted opening 82, chamber 30, and pipes 67 and 68. Such an emergency operation of the trailer brakes is entirely automatic and is not at all dependent on the operation of the brake valve. It is to be noted that an identical operation of the trailer brakes will be caused by the failure of tractor-carried pipes 3, 10, 18, 31 or 6 as hereinbefore described.

In the event of failure of trailer pipe 66, connecting the trailer reservoir and the relay-emergency valve, pressure in chamber 34 of such valve will be relieved and pressure in chamber 19 will therefore flow past the edge of diaphragm 21, thereby reducing the pressure in chamber 19 of the tractor relay-emergency valve, whereby pressure from tractor auxiliary reservoir 32 is allowed to flow to the tractor rear brake chambers 26. It will be seen therefore that on rupture of trailer pipe line 66, the tractor rear brakes will be applied, such application being automatic and not dependent upon operation of the brake valve.

In the event of failure of either of trailer lines 67 or 68, on operation of the tractor brake valve 9 the trailer reservoir will exhaust to atmosphere through pipe 66, chamber 34 of the trailer relay-emergency valve, past open valve 44, chamber 48, past opened valve 24, chamber 30, and through the broken line to atmosphere. Pressure in chamber 34 will thereby be reduced and tractor main reservoir pressure in chamber 19 of the trailer relay-emergency valve will flow past the edge of diaphragm 21, thereby reducing the pressure in chamber 19 of the tractor relay-emergency valve, causing tractor auxiliary reservoir pressure to flow to tractor rear brakes through line 33, chamber 34 of the tractor relay-emergency valve, past annular flange 22, through the restricted opening 82, chamber 30, and to truck rear brake chambers 26. It will be seen therefore that failure of trailer lines 67 or 68 will result in application of the rear truck brakes, but only when the brake valve on the truck is operated.

It will be apparent from the above description, taken in connection with the annexed drawings, that a fluid pressure braking system has been provided which insures at all times a safe and sufficient braking force for the vehicle carrying such system, regardless of the breaking or rupture of any part of the system. Although only one tractor and one trailer system have been described, it will be obvious to those skilled in the art that various modifications and other arrangements may be employed without, in any way, departing from the scope of the invention, for the limits of which reference will be had to the appended claims.

What is claimed is:

1. In a fluid pressure braking system having a compressor and a governor therefor of the type having a unloading line exhausting to the atmosphere only when the compressor is loaded, a reservoir, a connection from said reservoir to said governor, and a second reservoir connected to said first named reservoir through said governor only when the compressor is unloaded.

2. In a fluid pressure braking system having a compressor and a governor therefor of the type having an unloading line exhausting to the atmosphere only when the compressor is loaded, an auxiliary reservoir for fluid under pressure, means for subjecting said governor to the pressure of the fluid in said auxiliary reservoir, and a main reservoir connected to said auxiliary reservoir through said governor.

3. In a fluid pressure braking system having a compressor and a governor therefor of the type having an unloading line exhausting to the atmosphere only when the compressor is loaded, a reservoir for fluid under pressure, means for subjecting said governor to the pressure of the fluid in said reservoir, a second reservoir, and a valve subjected to the pressure of the fluid from both reservoirs and operable to communicate said second reservoir with the first reservoir when the compressor is loaded, said first reservoir communicating with the second reservoir through the governor when the compressor is unloaded.

4. In a fluid pressure braking system for a vehicle having front and rear brake chambers, a main reservoir, an auxiliary reservoir, a compressor for supplying fluid pressure to said main reservoir, governing means for said compressor of the type having an unloading line exhausting to the atmosphere when the compressor is loaded, means for conducting fluid pressure from said auxiliary reservoir to said main reservoir through said governing means only when the compressor in unloaded, valvular means for conducting fluid pressure from said main reservoir to the auxiliary reservoir when the compressor is loaded, and a brake valve for controlling the flow of fluid pressure from said main reservoir to said front brake chambers, said valvular means being automatically operable to connect said rear brake chambers and said auxiliary reservoir upon a reduction in main reservoir pressure due to failure of said front brake chambers.

5. In a fluid pressure braking system having a plurality of sets of brake chambers, a compressor, a primary reservoir connected with said compressor, a secondary reservoir, means including a combined relay and emergency valve for conducting fluid pressure from the primary reservoir to the secondary reservoir, a governor for said compressor of the type having an unloading line communicating with the atmosphere only when the compressor is loaded, means for conducting fluid from said secondary reservoir to the primary reservoir through said governor only when the compressor is unloaded, and means including a brake valve for connecting said primary reservoir to one of said sets of brake chambers and to simultaneously effect operation of said combined valve to connect the secondary reservoir to another set of brake chambers, said combined valve being automatically operable to connect said secondary reservoir to the last named brake chambers in response to a reduction in primary reservoir pressure due to failure of said first named set of brake chambers.

6. A fluid pressure braking system comprising brake chambers, a reservoir for fluid pressure, a connection between said chambers and reservoir, a pressure-operated valve for controlling said connection and subject to the pressure of the fluid in said reservoir, a second connection between said reservoir and chambers, a second valve carried by said first named valve for controlling said second connection, a guide for said second valve positioned in said first connection and formed as a choke to impede the flow of fluid pressure from said reservoir to said chambers through the first connection, a second reservoir of fluid pressure, and means for subjecting said first valve to the opposing pressure of fluid from the second reservoir to normally close the first valve and open the second valve, a decrease in pressure of the fluid from the second reservoir enabling a rapid opening of the first valve by fluid pressure from said first reservoir.

STEPHEN JOHNSON, Jr.